United States Patent [19]
Meng et al.

[11] Patent Number: 5,953,524
[45] Date of Patent: Sep. 14, 1999

[54] DEVELOPMENT SYSTEM WITH METHODS FOR RUNTIME BINDING OF USER-DEFINED CLASSES

[75] Inventors: Peihuan Meng, Mountain View; Steven M. Barrington, Fremont, both of Calif.

[73] Assignee: Sybase, Inc., Emeryville, Calif.

[21] Appl. No.: 08/755,054

[22] Filed: Nov. 22, 1996

[51] Int. Cl.⁶ .................................................. G06F 9/445
[52] U.S. Cl. ........................................................... 395/701
[58] Field of Search .................................. 395/683, 704, 395/135, 340, 701

[56] References Cited

U.S. PATENT DOCUMENTS

| | | | |
|---|---|---|---|
| 5,075,847 | 12/1991 | Fromme ................................... | 395/705 |
| 5,487,141 | 1/1996 | Cain et al. .............................. | 345/435 |
| 5,732,271 | 3/1998 | Berry et al. ............................. | 395/683 |
| 5,768,588 | 6/1998 | Endicott et al. ........................ | 395/683 |
| 5,774,725 | 6/1998 | Yadav et al. ............................ | 395/704 |

*Primary Examiner*—Tariq R. Hafiz
*Assistant Examiner*—Chameli C. Das
*Attorney, Agent, or Firm*—John A. Smart

[57] ABSTRACT

A multimedia application development system including an authoring environment and a runtime module for executing applications developed in the authoring environment is described. The system allows creation of customized objects (e.g., custom controls), by creating a user-defined class or "UDC." Typically, a UDC is created from one or more existing classes, inheriting, at least in part, behavior and functionality of those existing classes. The system provides methods where actual binding of properties and methods to an object instance of a class is deferred until runtime. With specific regard to UDC-created objects, the behaviors of parent classes are not bound to object instances at compile time. Instead, these behaviors are "late bound" by fetching them from the parent classes at runtime, on an "as needed" basis. Further, "which" particular parent classes are actually employed for this purpose at runtime can be altered, thereby providing further flexibility to the system. Since the UDC is bound only at runtime, the specific UDC actually employed can be changed up to the point of actual execution. As a result, the behavior for the object at runtime can be changed dramatically by simply re-directing the object to a different UDC (which may be one of many compatible UDCs). In this manner, the actual "context" of execution of an application at runtime depends on the particular context in which the application finds itself.

19 Claims, 11 Drawing Sheets

DEVELOPMENT SYSTEM WITH METHODS FOR RUNTIME BINDING OF USER-DEFINED CLASSES

CROSS REFERENCE TO RELATED APPLICATIONS

This Application is related to U.S. Ser. No. 08/620,066 filed on Mar. 21, 1996, naming Drewry et al. as inventors, and entitled "Client/server System with Methods for Prefetching and Managing Semantic Objects," which is incorporated herein by reference for all purposes.

BACKGROUND OF THE INVENTION

The present invention relates generally to information processing environments and, more particularly, to multimedia development tools which bind user-defined classes at runtime.

As computer processing power has increased, multimedia applications (e.g., applications including multiple media such as animation, audio clips, and the like) have become increasingly popular. As a result, development tools allowing moderately sophisticated developer/users to write such multimedia applications have appeared. Concurrently with the rise in multimedia has come an increase in the connectivity of computers to one another. For example, many computers are now connected to the Internet for access to Internet services such as the World Wide Web. In addition, relatively-limited computers known as "set top boxes" or "STBs" are available for connecting television sets to Interactive Television ("ITV") services.

ITV environments are typified by set top boxes, at individual customer sites (e.g., consumer home), connected via a broadband network to a central office. Such an environment is illustrated in FIG. 1 as Interactive Television (ITV) environment 100. The environment 100 includes a multitude of set top boxes (STBs) 110, such as set top box 101, connected via a high-bandwidth communication medium 120 (e.g., coax, fiber optic, and the like) to a central office 130. Each set top box itself is generally a small, economically-produced consumer unit which sets atop a television. Communication between the set top box and the central office is bi-directional. In general operation, the set top box 101 interacts with a television, such as television 103.

Through the set top box 101, the central office 130 can send streams of objects to customers, all upon specific requests by the customers. The term "objects," as used herein, encompasses not only classical "objects" with computational capability (e.g., C++ objects) but also non-computational objects, including data objects comprising video, pictures, audio, text, and other information. At the central office, one or more server computers (e.g., server 131) are employed for servicing the requests of each particular set top box. In particular, the servers "serve" information to the set top boxes, including information about the kind of services and features (e.g., videos) that the customer or user can receive on his or her TV. Services which the user might receive include, for instance, a travel service, a weather service, a home shopping service, a video rental service, and the like.

The set top box itself is a microcomputer in its own right and, thus, includes common microcomputer components, such as a microprocessor (e.g., Intel 486) and memory (e.g., random-access memory or "RAM"). Since set top boxes are generally geared to the mass consumer market, they must be produced economically. Accordingly, memory in such boxes is typically constrained, relative to what one would find in a desktop computer. Since these clients have a small amount of memory, a problem exists as to how one optimizes the use of local memory: specifically, what objects are brought into local memory and what objects are tossed out of local memory (e.g., during low memory conditions).

Multimedia applications for ITV services popularly take the form of on-demand video, on-demand audio, on-line games, shopping services, and so forth. Supporting the creation of such diverse programming content are object-oriented development tools. These tools allow developers to build multimedia applications from pre-existing "classes" of available objects. Common examples of predefined classes include those specifying application features, such as buttons and other user interface elements, as well as ones for audio clips, text, and the like. Here, a developer can combine specific "instances" of these various classes in interesting ways to form user-defined classes or "UDCs." Typically, one would create a new "subclass"—a class which inherits at least some characteristics and behavior from an existing class (e.g., one provided by a tools vendor). In this regard, the existing class is a "parent" class or "superclass"; the new class, on the other hand, is the "child" class or "subclass."

In conventional multimedia development environments, user-defined classes of a multimedia application are "bound" to the behaviors defined for the parent classes, from which they inherit, at the time when the application is first compiled. While this is the simplest approach for binding behavior to classes of objects, it unfortunately introduces some inflexibility into the application. Specifically, the approach limits the ability of one to modify characteristics or behavior of such application without rewriting and then recompiling the application. Suppose, for instance, one wants to change how an object draws itself—that is, make a core change to the draw method for the class from which that object is instantiated. With the prior art approach of binding behavior to objects at compile time, such a change is not feasible.

The problem is as follows. Typically, when a multimedia application is compiled, objects (i.e., instances of classes) have all their properties and behaviors included or bound to the compiled version of the application. Thus, the resulting executable binary form of the application includes in binary format all features of all objects that comprise the application. Changes to features at this point require one to return to the development environment and reauthor an appropriate portion of the underlying source code and then recompile the application (i.e., regenerate the application). This inflexibility becomes especially problematic with applications which are made available over the World Wide Web or over ITV systems, as these applications typically require frequent modification.

What is needed is a development environment implementing methods which allows users-developers to specify that certain features of the application—the properties and behaviors that define objects—can be modified readily at runtime. The present invention fulfills this and other needs.

SUMMARY OF THE INVENTION

The present invention is directed to a multimedia application development system. An exemplary embodiment of such a system includes at least an application authoring environment and a runtime module for executing applications developed in the authoring environment. A multimedia application produced by the authoring environment will typically include an application object which, in turn, comprises a plurality of related objects or components which define that application. These objects have specific behaviors associated with them, such as a particular response to certain user-initiated events. The various objects used to build the multimedia application may be pre-defined objects such as rectangles, ellipses, audio clips, and the like, which are all made available from the development environment.

Often, however, one must resort to some amount of customization, in order to achieve the appropriate behavior for an application under development. A common approach to providing such customization is to create customized objects (e.g., custom controls), typically by creating a user-defined class or "UDC." Typically, a UDC is created from one or more existing classes, inheriting, at least in part, behavior and functionality of those existing classes. In essence, a UDC can be viewed as a user-created "subclass" derived from one or more parent or "super" classes. Each parent class typically embodies some discrete functionality. For example, a developer can create a "screen button" UDC which itself inherits from a rectangle class and a text class. Here, the user-defined subclass inherits behaviors from the predefined rectangle and text classes. These UDCs can, in turn, be employed in an application by specifying instances of UDCs—that is, objects created from UDCs.

In accordance with the present invention, actual binding of properties and methods to an object instance is deferred until runtime. With specific regard to UDC-created objects, the behaviors of parent classes are not bound to object instances at compile time. Instead, these behaviors are "late bound" by fetching them from the parent classes at runtime, on an "as needed" basis.

Further, "which" particular parent classes are actually employed for this purpose at runtime can be altered, thereby providing further flexibility to the system. Consider, for example, an application originally written to include an object instance of a UDC for a screen button. Since the UDC is bound only at runtime, the specific UDC actually employed can be changed up to the point of actual execution. As a result, the behavior for the object at runtime can be changed dramatically by simply re-directing the object to a different UDC (which may be one of many compatible UDCs).

Application objects are constructed to dynamically accept one of several UDC "prototypes," in order of preference, when the application is running. An application can specify as a "first choice" a UDC prototype available through a particular URL (Universal Request Locator) or "Web" site. During runtime execution, therefore, the application will preferentially use that UDC, by attempting to load it from the URL site. If that UDC is unavailable at runtime (e.g., the corresponding Web server is down), however, the application can instead resort to its "second choice" UDC, such as a UDC resident on a Local Area Network (LAN). If that UDC is not available (e.g., the LAN is down), the application can turn to its "third choice" UDC, such as a UDC stored on a local storage device (e.g., local hard disk).

As another example, consider an ITV application employing a UDC which specifies a particular background (e.g., bitmap image). An ITV service provider may desire to change the background color with the changing seasons of the year. To do so, the provider simply includes an application which references, as one of its choices, a prototype from a URL storing a background which changes with the seasons. The application itself need not be changed or re-compiled. This dynamic changing of the application's behavior can be accomplished by simply swapping in and out various prototypes from the ITV server, or by adding logic to the application (e.g., aliasing) whereby the specific UDC sought is resolved dynamically at runtime. In this manner, the actual "context" of execution of an application at runtime depends on the particular context in which the application finds itself.

DETAILED DESCRIPTION OF A PREFERRED EMBODIMENT

Figure 1:
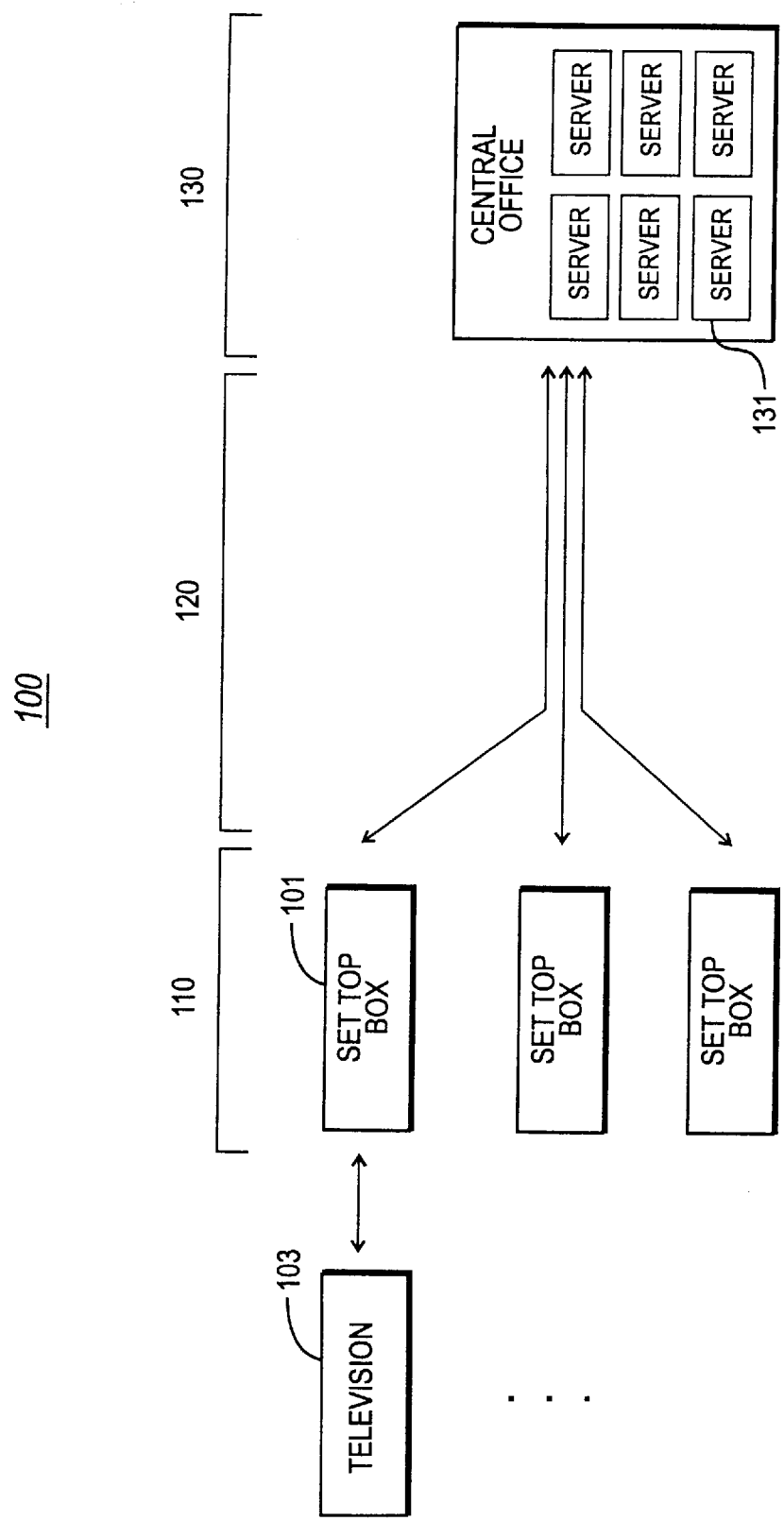
FIG. 1 is a block diagram of an interactive TV (ITV) environment.

The following description will focus on the presently-preferred embodiment of the present invention, which is operative in a network environment executing multimedia applications. The present invention, however, is not limited to any particular application or environment. Instead, those skilled in the art will find that the present invention may be advantageously applied to any application or environment where at least some features of an application are bound to the application at runtime. Although the following description of the present invention will focus on multimedia applications, the invention can also be advantageously applied to any application in which objects are bound to the application at runtime. The description of the exemplary embodiments which follows is, therefore, for the purpose of illustration and not limitation.

Semantic Objects

A. General

In certain systems, such as set top boxes (for television systems), there exists very little local memory. In such clients with a small amount of memory, systems have to be intelligent about what is kept in local memory (i.e., cached) and what is tossed out. A similar problem exists for systems connected to the Internet, but for different reasons. On the Internet and for Interactive Television (ITV), the networks employed are relatively slow and, thus, incur a high latency when servicing requests for objects. To load an application from such a system, for instance, it might be required that a relatively large portion of the application be transmitted to the local client which then must load particular bits of the transmitted application into core for execution. The latency for performing this task is typically on the order of several seconds, or even minutes. When clients with small memory (e.g., set top boxes) are connected to such networks (e.g., the Internet), the problem is expectedly compounded. Here, there is a high penalty for I/O (input/output) operations, and very little room on the client side for caching objects which have been transmitted.

"Prefetching" is a technique which can address this problem. In general, prefetching is the notion of fetching additional items when a request is made for a particular item, such as for an object present on a storage device of a remote computer. Prefetching is a fairly well-known feature of virtual memory management systems, such as those previously-described in the Background section. One common scheme is an LRU (least-recently used) scheme, where objects which are least-recently used are "aged out." In those prior art systems, however, the developer or programmer is typically given little or no control over prefetching. Such systems, in typical operation, will page in (i.e., load) or page out objects, based on physical considerations, such as when were particular memory pages last used, whether the requesting application is idle, and the like. Furthermore, such systems tend to make the very same decisions, of whether to page in a particular object, based on a fairly static set of rules.

In the system of the present invention, in contrast, the developer can predefine a set of behaviors based on "objects"—the items which are really of interest. Each object is packaged in a "storable," which incorporates dependency lists indicating the context in which the object is to be used (i.e., with which dependent objects). Moreover, the developer can specify that the set of behaviors is defined at runtime, using "prefetch" primatives provided by the system. This allows an executing application to prefetch objects based on the then-existing dynamics of the system. The system can, for example, prefetch objects based on an end user's particular runtime interaction with the system. Even when no prefetch behavior is defined by the developer, the system includes default methods for optimizing prefetching of objects. Using the list of dependencies, for instance, a server component in the system can prepare to send and/or send additional objects to a client when servicing a request for a particular object.

Independent of the above-described problem of network speeds, prefetching based on semantic objects has ramifications for the type of application which can now be built. A server can process a request for an object in the context of the particular client making the request. Contents of an application are dynamically varied by changing the objects which are related to an object being requested. Programming logic for deciding which related objects to return with a requested object can be embodied in stored procedures resident at the server. For example, a first client can issue a request for "thing." For that client, "thing" might mean particular program content, such as a bitmap image. In a similar manner, a second client might request "thing." In a manner transparent to each client, the server can process the request for "thing" in the context of each client. For the first client, "thing" might mean a bitmap image at a particular resolution. For the second client, however, "thing" might mean the same bitmap image, but at a lower resolution. Here, the server can change what each client gets as "thing," based on the server's knowledge of each client. This approach can be applied to change the actual application or content. Alternatively, it can be employed to change the quality (i.e., resolution) of the object which is delivered to the client.

B. System environment

1. General system

The present invention may be implemented in those environments which provide a "host," such as a "server," connected to at least one "client." Generally, such a "client/server" environment is characterized by a multitude of clients connected via a broadband communication network to one or more servers. The server(s), operating under a server operating system (e.g., UNIX), includes a database server subsystem. In general operation, clients store data in and retrieve data from one or more database tables resident on the server by submitting SQL commands, some of which specify "queries"—criteria for selecting particular records of a table. Commercial examples of these "client/server" systems include Powersoft™ clients connected to one or more Sybase SQL Server™ database servers. Both Powersoft™ and Sybase SQL Server™ are available from Sybase, Inc. of Emeryville, Calif.

Client/server environments, database servers, and networks are well documented in the technical, trade, and patent literature. For a discussion of database servers and client/server environments generally, and SQL Server™ particularly, see, e.g., Nath, A., *The Guide to SQL Server*, Second Edition, Addison-Wesley Publishing Company, 1995. Additional documentation of SQL Server™ is available from Sybase, Inc. as *SQL Server Documentation Set* (Catalog No. 49600). For a discussion of a computer network employing Microsoft Networks/OpenNet File Sharing Protocol, see METHOD AND SYSTEM FOR OPPORTUNISTIC LOCKING IN A NETWORKED COMPUTER SYSTEM, Intl. Application No. PCT/US90/04570, Intl. Publication No. WO 91/03024, Intl. Publication Date Mar. 7, 1991. For a general introduction to use of a network, such as a Local Area Network (LAN) operating under NetWare, see Freed, L. et al., *PC Magazine Guide to Using NetWare*, Ziff-Davis Press, 1991. A more detailed discussion of NetWare networks is available in NetWare 3.x and 4.x and accompanying documentation, which is available from Novell of Provo, UT. The disclosures of each of the foregoing are hereby incorporated by reference.

2. ITV Client/Server System

Figure 2A:
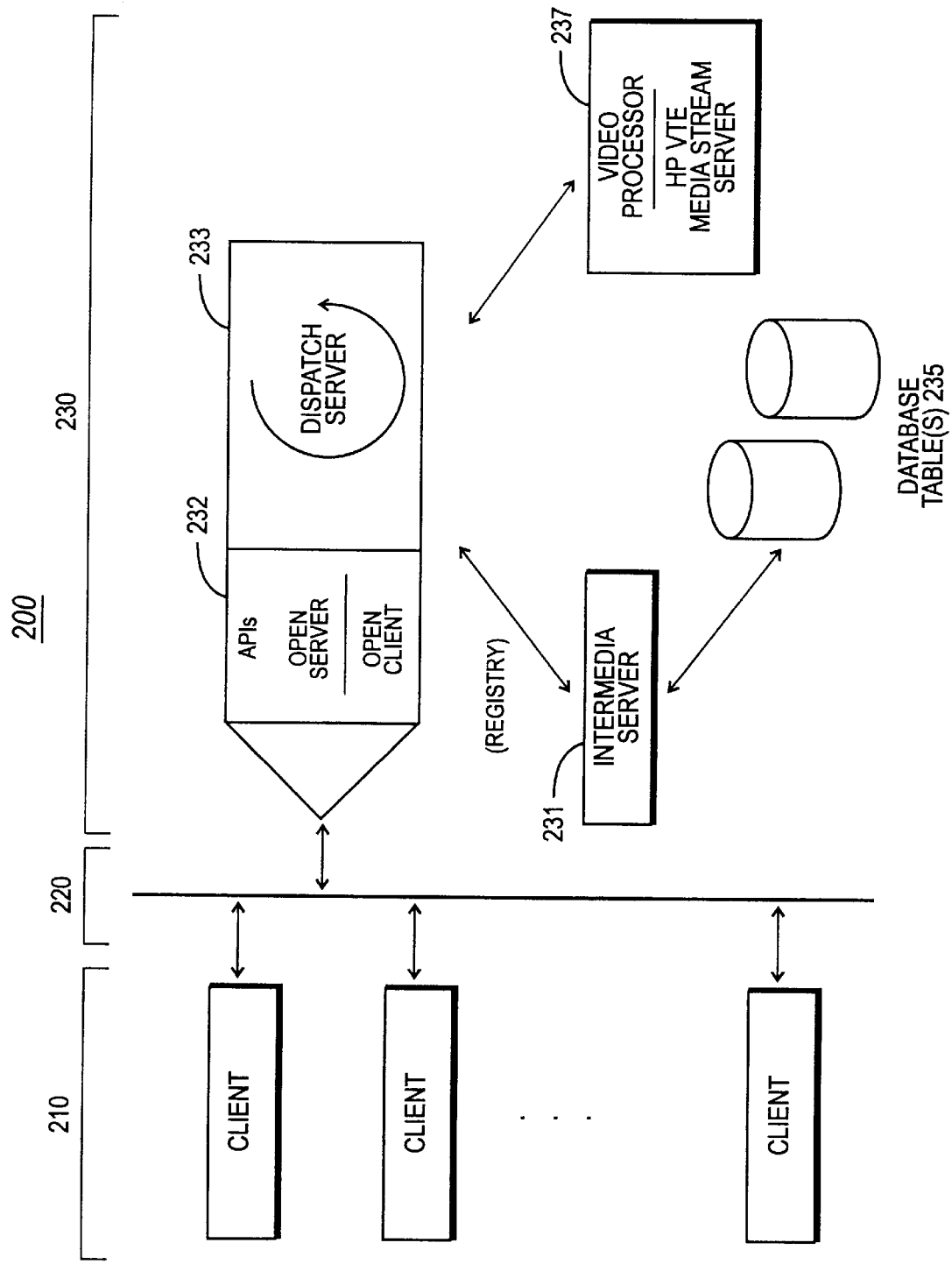
FIGS. 2A–B are block diagrams illustrating interactive television (ITV) client/server systems in which the present invention may be embodied.
Figure 2B:
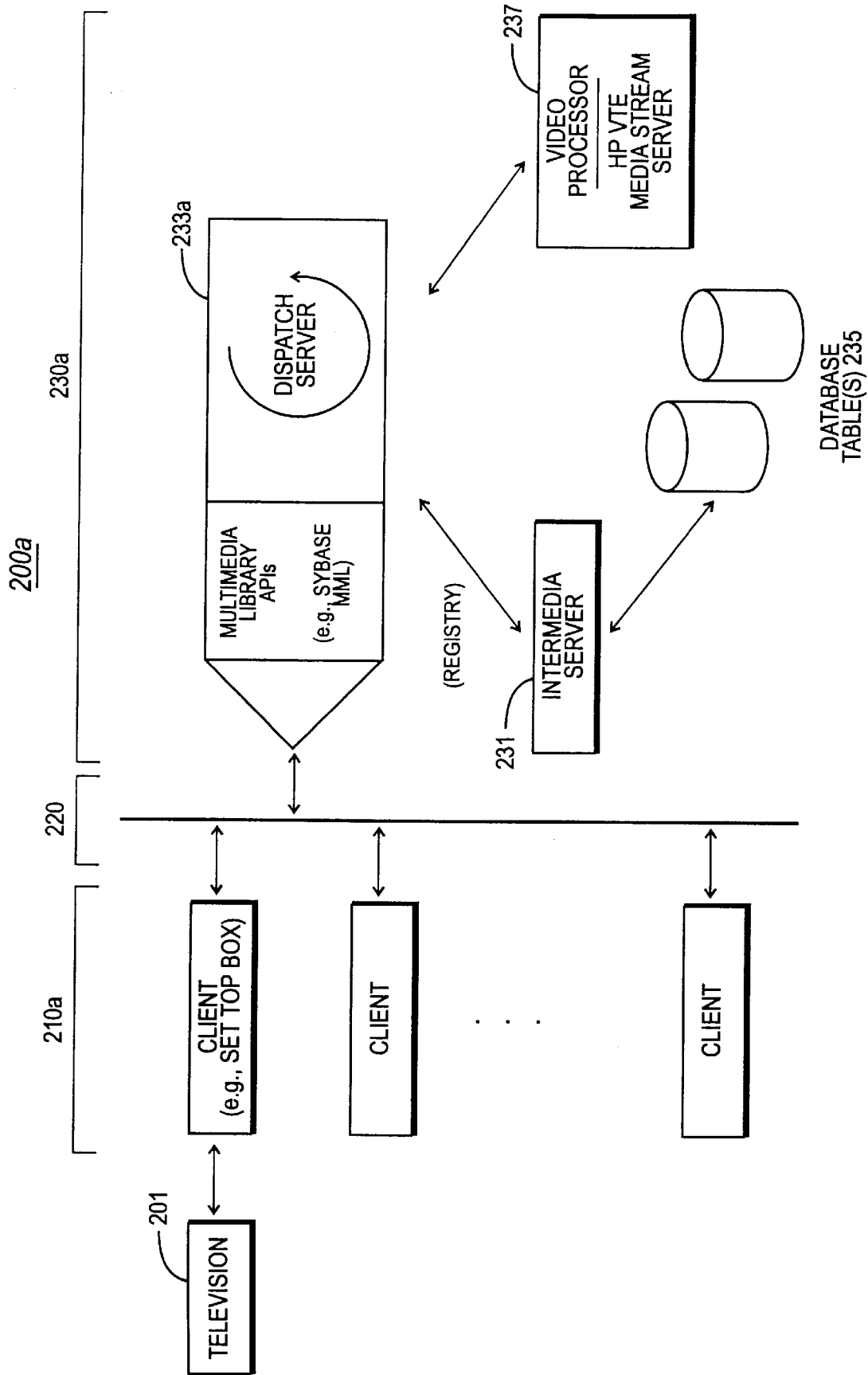

FIGS. 2A–B are block diagrams illustrating Interactive Television (ITV) Client/Server systems in which the present invention may be embodied. Multimedia Client/Server System 200 comprises one or more Clients 210 connected to a Server module 230, via a Broadband Communication Network 220. Server module 230 comprises a plurality of servers, including a Dispatch Server 233 linked into an Open Server/Open Client API (Application Programming Interface) 232, an Intermedia Server (Sybase SQL Server) 231, and a Video Processor/Media Stream Server 237. Data for the Intermedia Server is stored in Table(s) 235. The Video Processor 237, which may comprise an available third party media server, provides information content (e.g., multimedia) under control of the Dispatch Server 233. In a preferred embodiment, Video Processor 237 is a Hewlett-Packard VTE Media Stream Server, available from Hewlett-Packard of Palo Alto, Calif. The Video Processor 237 serves as a means for storing video content which is provided to Clients (set top boxes) under control of the Dispatch Server 233.

Each of the Clients 210 operates under control of one or more applications developed in conjunction with the Application Programming Interface (API) 232 for communicating with the Servers. In the embodiment of FIG. 2A, the interface 232 for communicating with the Servers comprises Sybase® Open Server™/Open Client™ interface (available from Sybase, Inc. of Emeryville, Calif.). The Interface provides entry points (e.g., named functions) which Clients can call into for requesting services from the Servers. On the Server side, a core services library is provided for servicing Client requests. The library includes functionality for receiving queries and returning rows back, for instance. The Open Server/Open Client interface is in communication with the Dispatch Server, so that calls for database (and related) functionality are routed from the interface to the Dispatch Server, for appropriate dispatching within the Server Module.

FIG. 2B illustrates an Interactive Television (ITV) Client/Server System 200a, which is employed in a preferred embodiment. Here, Clients 210a comprises one or more set top boxes (STBs) connected to Server module 230a, via the Broadband Communication Network 220. Server module 230a is essentially identical to Server module 230 except that the Interface has been changed to one which supports multimedia, as shown by Dispatch Server 233a. In a preferred embodiment, the Interface employed is Sybase MML (Multimedia Library), available from Sybase, Inc. of Emeryville, Calif. Each of the STB Clients 210 is typically connected to a television, such as TV 201. Here, the Video Processor 237 serves as a means for storing video content which is provided to Clients (set top boxes) under control of the Dispatch Server 233a.

3. Authoring System

Figure 2C:
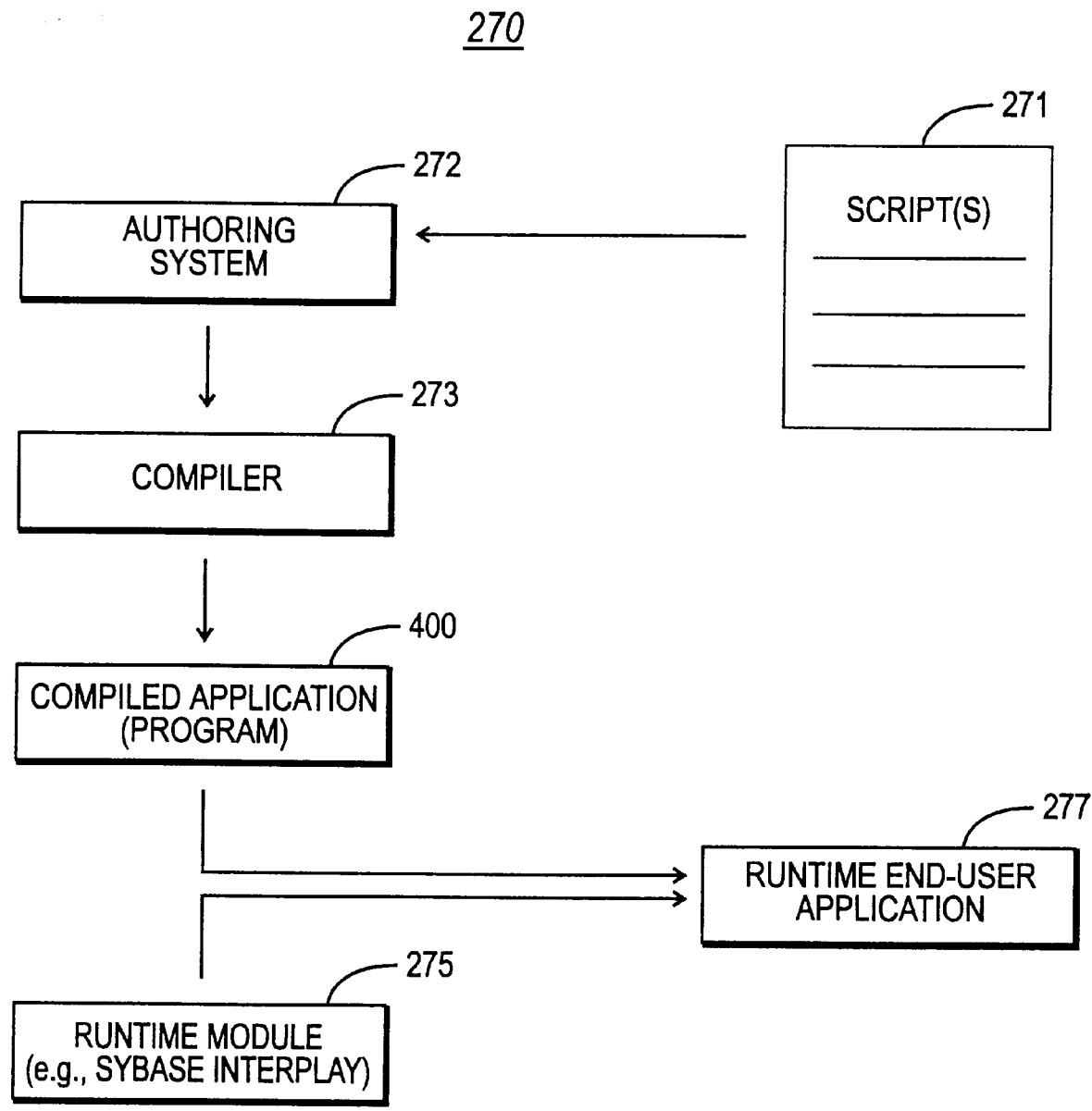
FIG. 2C is a block diagram illustrating an "authoring" system of the present invention for creating applications.

In parallel to the Interactive Television (ITV) Client/Server System, an additional system is employed for creating applications which reside on the server and run at the client. This second system 270, shown in FIG. 2C, is generally referred to as an "authoring" system. In a preferred embodiment, the system 270 comprises GainMomentum®, available from Sybase, Inc. of Emeryville, Calif. During typical use of the system, a developer employs the authoring system 272 for creating a source code description or Scripts 271 (i.e., GainMomentum Script) of the program under development.

The Scripts 271, in turn, are "compiled" by the compiler 273. Here, the compiler parses the information generated by the authoring system, for creating a compiled version of the program under development. As shown, the compiler 273 emits compiled application program 400. In the presently-preferred embodiment, the compiled application program 400 comprises a bytecode sequence encoding opcode instructions. Here, the compiler emits bytecode which is a pre-compiled intermediate code having a format allowing it to run on "virtual machines." At runtime, the bytecode is interpreted by a runtime module or interpreter 275 which, in turn, serves as a virtual machine for executing the logic embodied in the bytecode on a particular target machine (e.g., Windows client). In this manner, the application is deployed, together with a runtime module or interpreter 275, as a runtime application 277 at a target machine.

The Scripts 271 may, among other functions, define the behaviors of the objects that comprise the application. In such cases, Scripts 271 are saved with particular objects for which they provide behaviors. These objects may be default objects provided with the authoring tool or they may be UDC (User-defined Class) prototypes authored by the user. A particular script may, for example, take the form of a first statement creating a particular instance of an object type, and a second sequence of statements defining a particular behavior of the instance. For example, a particular script may take the following form.

Create rectangle
On mouse down
Do behavior
End mouse down

In the above example, the "Create rectangle" statement specifies an instance of a default object type for representing the display of a rectangle on the screen. The "On mouse down" and "End mouse down" statements delineate the period over which a particular behavior (specified by the "Do behavior" statement) takes place. An example of the behavior specified in response to the mouse down event might be a change of color of the rectangle.

Context-driven, dynamic-binding of application objects

A. General

The present invention is directed to an application development system. An exemplary embodiment of such a system includes at least an application authoring environment and a runtime module for executing applications developed in the authoring environment. A multimedia application produced by the authoring environment will typically include an application object which, in turn, comprises a plurality of related objects or components which define that application. These objects have specific behaviors associated with them, such as a particular response to certain user-initiated events. The various objects used to build the multimedia application may be pre-defined objects such as rectangles, ellipses, audio clips, and the like, which are all made available from the development environment.

Often, however, one must resort to some amount of customization, in order to achieve the appropriate behavior for an application under development. A common approach to providing such customization is to create customized objects (e.g., custom controls), typically by creating a user-defined class or "UDC." Typically, a UDC is created from one or more existing classes, inheriting, at least in part, behavior and functionality of those existing classes. In essence, a UDC can be viewed as a user-created "subclass" derived from one or more parent or "super" classes. Each parent class typically embodies some discrete functionality. For example, a developer can create a "screen button" UDC which itself inherits from a rectangle class and a text class. Here, the user-defined subclass inherits behaviors from the predefined rectangle and text classes. These UDCs can, in turn, be employed in an application by specifying instances of UDCs—that is, objects created from UDCs.

B. Binding behavior of UDC objects at runtime

In accordance with the present invention, actual binding of properties and methods to an object instance is deferred until runtime. With specific regard to UDC-created objects, the behaviors of parent classes are not bound to object instances at compile time. Instead, these behaviors are "late bound" by fetching them from the parent classes at runtime, on an "as needed" basis.

Further, "which" particular parent classes are actually employed for this purpose at runtime can be altered, thereby providing further flexibility to the system. Consider, for example, an application originally written to include an object instance of a UDC for a screen button. Since the UDC is bound only at runtime, the specific UDC actually employed can be changed up to the point of actual execution. As a result, the behavior for the object at runtime can be changed dramatically by simply re-directing the object to a different UDC (which may be one of many compatible UDCs).

Application objects are constructed to dynamically accept one of several UDC "prototypes," in order of preference, when the application is running. An application can specify as a "first choice" a UDC prototype available through a particular URL (Universal Request Locator) or "Web" site. During runtime execution, therefore, the application will preferentially use that UDC, by attempting to load it from the URL site. If that UDC is unavailable at runtime (e.g., the corresponding Web server is down), however, the application can instead resort to its "second choice" UDC, such as a UDC resident on a Local Area Network (LAN). If that UDC is not available (e.g., the LAN is down), the application can turn to its "third choice" UDC, such as a UDC stored on a local storage device (e.g., local hard disk).

As another example, consider an ITV application employing a UDC which specifies a particular background (e.g., bitmap image). An ITV service provider may desire to change the background color with the changing seasons of the year. To do so, the provider simply includes an application which references, as one of its choices, a prototype from a URL storing a background which changes with the seasons. The application itself need not be changed or re-compiled. This dynamic changing of the application's behavior can be accomplished by simply swapping in and out various prototypes from the ITV server, or by adding logic to the application (e.g., aliasing) whereby the specific UDC sought is resolved dynamically at runtime. In this manner, the actual "context" of execution of an application at runtime depends on the particular context in which the application finds itself.

As will be described in greater detail hereinbelow, this dynamic nature is made possible by providing placeholders in the compiled version of the multimedia application. These placeholders preserve an interface or protocol for communicating with an ever-changing UDC prototype.

C. Hierarchical storage of objects in an application

Figure 3:
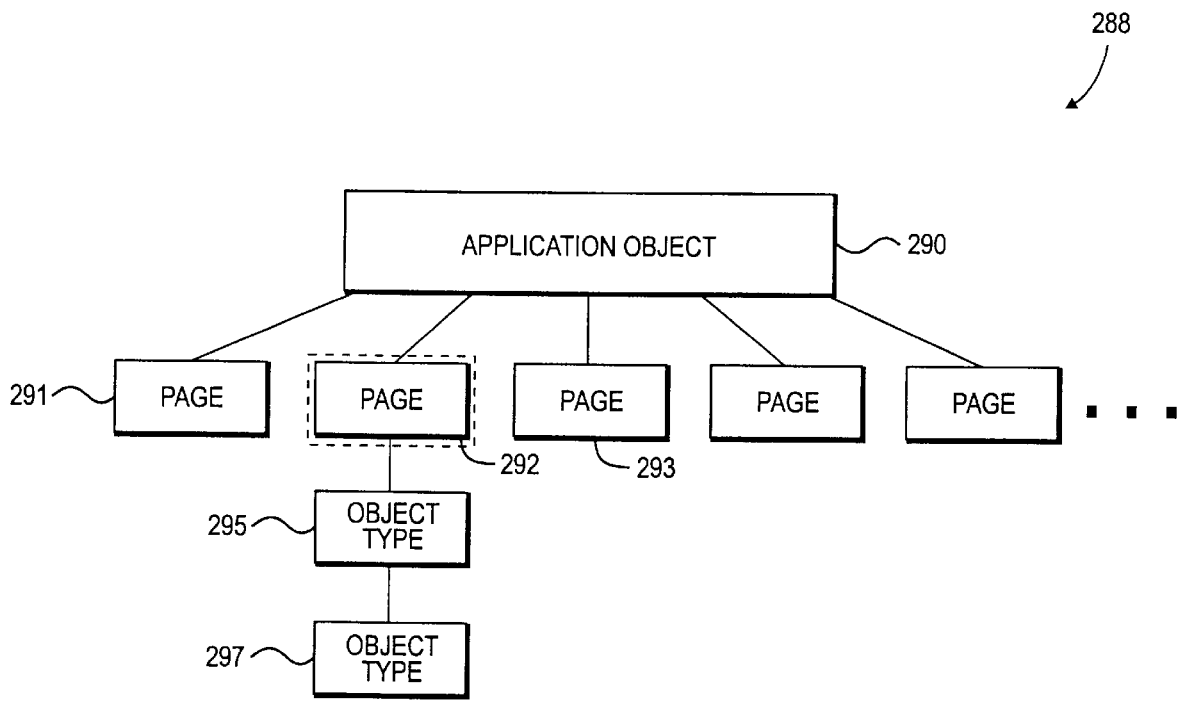
FIG. 3 is a block diagram illustrating a containment hierarchy representing relationships between objects which comprise an application in the system of the present invention.

A containment hierarchy 288 for an application is shown in FIG. 3. The application includes an "application object" 290 as a basic object type at the top level of the containment hierarchy. Application object 290, in turn, contains one or more "page" objects such as page object 291, page object 292, page object 293, and so forth. Each page object itself can have children that are of any other object type (but usually not a page object or an application object). For example, a page object can have children objects comprising rectangle objects, audio clip objects, and the like. In the containment heirarchy 288 shown in FIG. 3, page object 292 contains a box object 295 and, in turn, its child object, a rectangle object 297. These are the various objects which comprise the contents of each page object. In typical system use, these objects are specified by the author (user programmer) at authoring time.

At runtime, at least some of the page objects take turns assuming the role of the window page or "win page"—the currently-displayed page or window. That is, when an application is running, only the contents of the current win page are visible on the display screen. As indicated by the dashed frame in FIG. 3, page object 292 represents the win page at a given instance in time.

At runtime, the win page designation switches among the various pages available in the application. This traversal is controllable programmatically by a "go to page" primitive provided by the system. Suppose, for example, that the application comprises an ITV hotel reservation program, and that page object 291, which serves as an initial win page, provides a list of destinations. Detailed information resides on page 293. When the user clicks on a destination displayed on page object 291, the system, in turn, sets page object 293 as the win page, for displaying reservation details for the user-selected destination. The user then interacts with the displayed contents of win page 293 to request a reservation.

D. Methodology of resolving handling of events

When an event occurs that must be handled, runtime module or interpreter 275 (FIG. 2C) first determines which particular object is associated with the event. For example, the event might be a "mouse click" event occurring at rectangle object 297. When such an event occurs, the interpreter locates an event handler from programmer-supplied "Script"—that is, the set of instructions defining how the system is to handle the event. The interpreter first looks to the object at which the event occurred (e.g., the rectangle object in the present example). If the appropriate event handler is found at the object, it is invoked with the event (i.e., its associated script instructions are executed).

If an appropriate handler is not found, however, the interpreter looks to handlers of other UDC prototypes for that object. If such prototypes do not exist or if they exist but do not contain the necessary event handler, the active object's parent object, if any, is examined for an appropriate handler. If it has none (or it does not exist), the next higher level object, such as a page object, is examined. Ultimately, if no prototypes or no other objects in the application contain the necessary handler, the application object itself is examined. If it too does not contain an appropriate event handler, the event is simply ignored. However, if at any stage during the evaluation an appropriate event handler is found, the associated Script is executed.

Figure 4A:
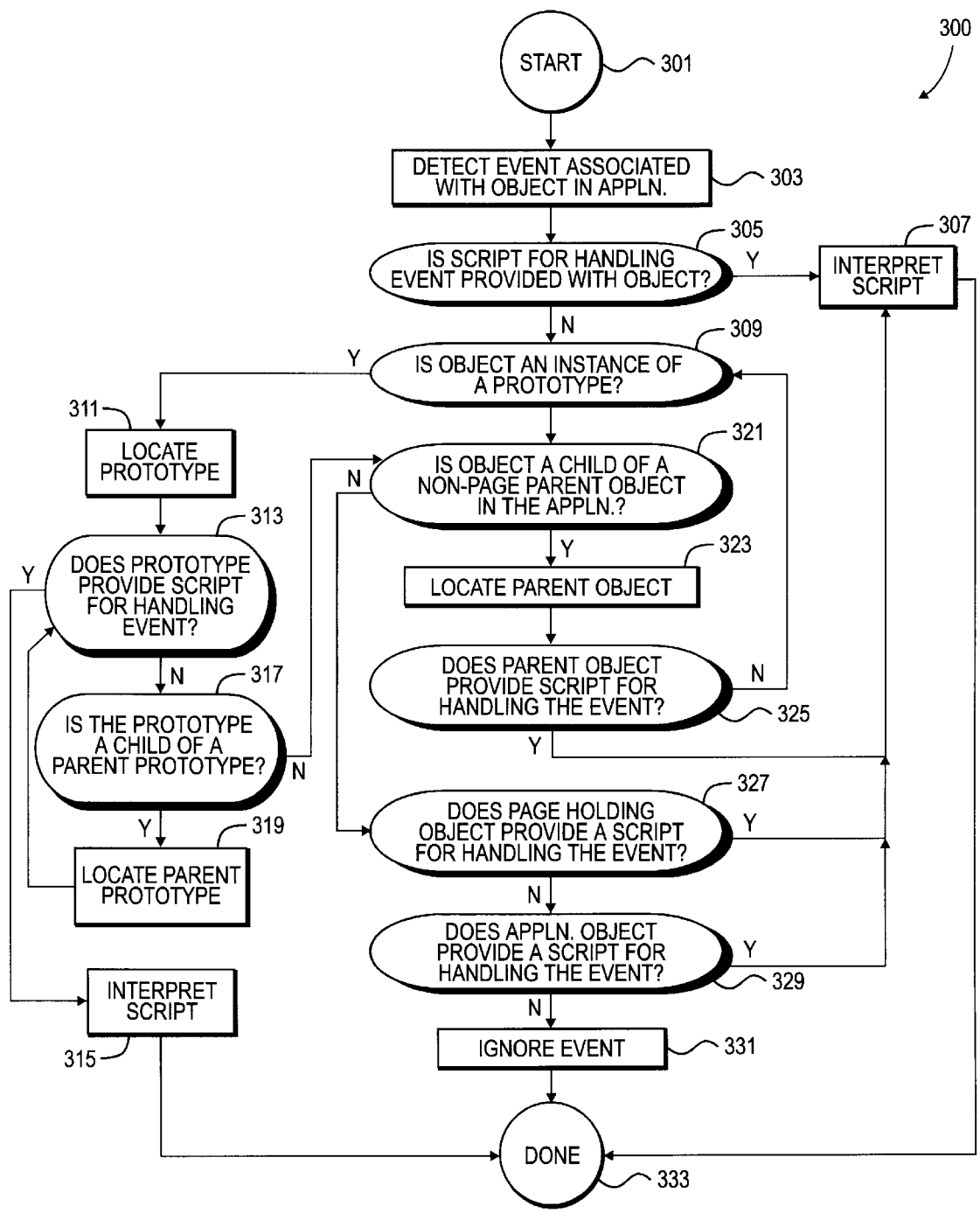
FIG. 4A is a flowchart illustrating a method of the present invention for invoking an appropriate event handler for processing an event which has occurred.

Upon finding an appropriate event handler, the event is processed. FIG. 4A is a diagram illustrating the method steps 300 performed by the event handler for processing an event. At step 303, the triggering event is detected. Thereafter, at a decision step 305, the interpreter determines whether the event handler for handling the event is provided by the object that has received the event. If it is, the associated Script (handler) simply executes, as indicated by step 307, and the process is done (step 333).

If, on the other hand, the interpreter determines that the event handler for handling the event is not provided with the object, the handler determines whether the object is an instance of a prototype at a decision step 309. If so, that prototype is located at step 311. The interpreter then determines whether that prototype provides an appropriate event handler for handling the event and, at step 313. If so, the associated Script is simply executed, at a step 315, and the method concludes (at step 333). If, on the other hand, the prototype does not include the event handler for handling the event, the method determines, at step 317, whether the current prototype is a child of another prototype. If it is, that (parent) prototype is located at step 319; the method then returns to decision step 313 where the parent prototype is examined to determine whether it has an event handler for handling the event.

If no prototype in the chain contains a Script for handling the event, eventually decision 317 will be answered in the negative. At that point, the interpreter determines whether the basic object which had received the event is a child of a parent object in the application at a decision step 321. Note that if the event handler determines that the object receiving the event is not located at instance of a prototype (i.e., decision step 309 is answered in the negative), then process control is also directed to decision step 321. Assuming that the object under consideration is, in fact, a child of a parent object in the application, then that parent object is located at a process step 323. Then, a decision step 325 determines whether that parent object provides an event handler for handling the event under consideration. If so, the associated Script is executed at process step 307 and the process is thereafter completed at 333. On the other hand, if the parent object does not provide a Script for handling the event, then process control returns to decision step 309 where the event handler determines whether the parent object is an instance of some prototype. If so, the prototype or types are examined as described above with reference to steps 311, 313.

If decision step 309 determines that the parent object is not in fact an instance of a prototype, then process control returns to decision step 321 where the interpreter determines whether the parent object under consideration is in fact a child of some other parent object. At some point, there will be no further non-page parent objects to be examined in the application. At that point, decision step 321 is answered in the negative and process control is directed to a decision step 327 which determines the page object holding the object under consideration (and which provides the Script for handling the event). If so, that Script is interpreted at step 307 and the process is completed at 333. At decision step 329, the system determines whether the application object at the top of the containment hierarchy provides a Script for handling the event. If so, that Script is interpreted at 307 and the process is completed as described above. If the application object does not, itself, provide the necessary Script, then that Script is simply ignored as indicated at process step 331 and the process is thereafter completed at 333.

Figure 4B:
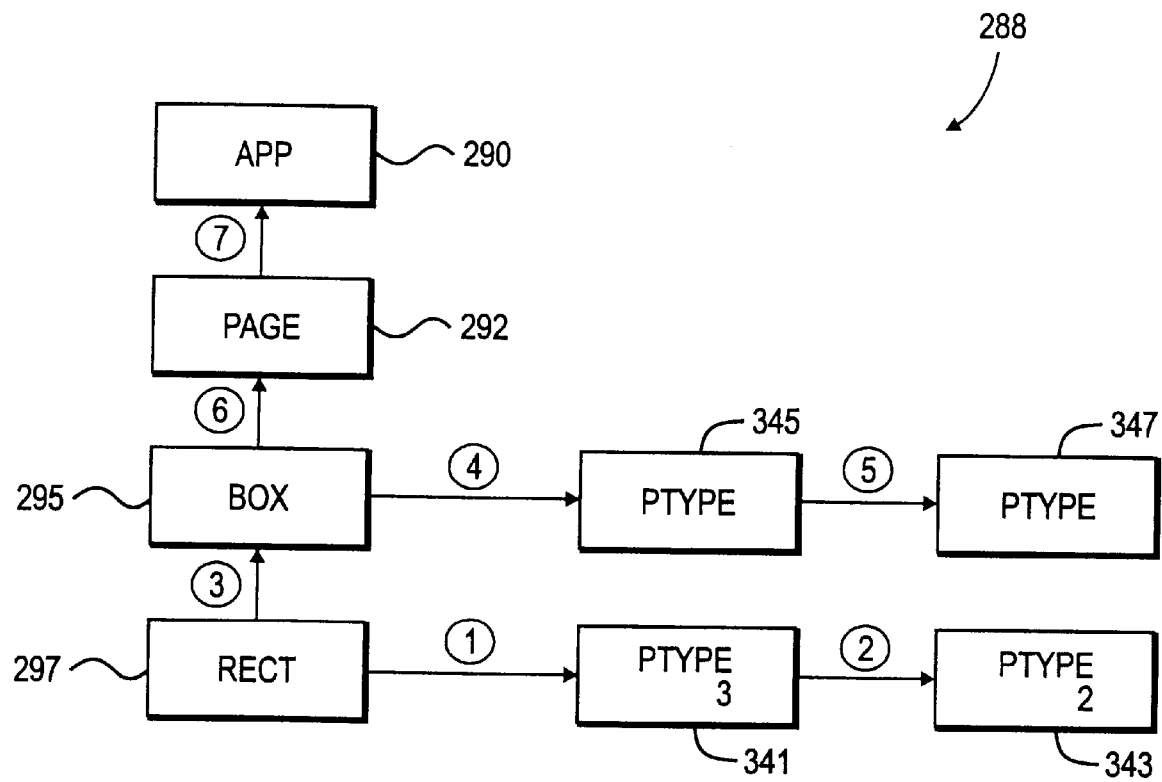
FIG. 4B is a block diagram illustrating a process for locating a script which includes appropriate instructions for handling an event occurring in the system.

The above procedure 288 for locating a Script is illustrated schematically in FIG. 4B. Assuming that the event to be handled is performed on a rectangle object 297, that object is itself first examined for the appropriate Script. Assuming that no such Script exists, the first place the event handler looks for the Script is in any prototypes of which rectangle object 297 is an instance. In the example of FIG. 4B, there is a parent prototype 343 and a child prototype 341 associated with rectangle object 297. Therefore, the interpreter will first look to prototype 341 for an appropriate event handler. If it finds none there, it will next look to prototype 343 for the appropriate event handler. If the necessary event handler is not found with rectangle object 297 or either of its prototypes, the interpreter will next look to any parent objects of rectangle object 297. As shown in this example, rectangle object has a parent box object 295. If the appropriate Script is found with box object 295, that Script is simply executed. If, however, no such Script is located there, the interpreter will determine whether box object 295 itself has any prototypes. In this example, box object 295 includes a prototype 345 which itself has a prototype 347. Prototype 345 is examined first, and if no appropriate Script is there, then the prototype 347 is examined.

If after all this searching, no Script is still found, then the interpreter next looks to any further parent objects of box object 295. In this example, box object 295 has a parent page object 292; thus, the interpreter would next look to page object 292 for the Script. If the Script is found there, it is simply executed. If not, the last place the interpreter will look will be application object 290. If the Script is found there, it is executed; otherwise, the Script is ignored.

E. Locating a prototype at runtime

As previously noted, a developer will include instances of UDC prototypes in a multimedia application. When the application is to be executed, those prototypes are located in order for the application to execute properly. The developer has the option of specifying that the prototype be fetched from any of a number of locations. In a simplest case, the developer may actually include the prototype in the application. In that case, the prototype is "bound" to the application at authoring time (as opposed to runtime). Alternatively, the developer may specify that the prototype be fetched from some other application and brought into the executing application at runtime. This is an example of "late binding."

When copies of the prototypes are provided in an application, the compiler reserves a separate page or pages in the application for prototypes. These pages are referred to as "reference pages." Unlike other pages, reference pages are not traversed (viewed) during execution of the application; the reference pages cannot become win pages during execution.

When an application created by the developer is saved, the authoring system generates a "dependency list" which specifies a primary location from which a prototype should be retrieved. This primary location may be a reference page or other page within the application as mentioned above. Alternatively, the primary location may be one or more "remote" locations outside of the executing application. These remote locations may include: (1) a real prototype application residing somewhere outside the containment hierarchy for the executing application, (2) a URL (Universal Request Locater) address for a World Wide Web site, and (3) a server address for an ITV server (e.g., Sybase Intermedia™ Server, available from Sybase, Inc. of Emeryville, Calif.). Further description of the construction and operation of "dependency lists" is available from the previously-mentioned, commonly-owned U.S. patent application Ser. No. 08/620,066 filed on Mar. 21, 1996, which was previously incorporated by reference.

Figure 5:
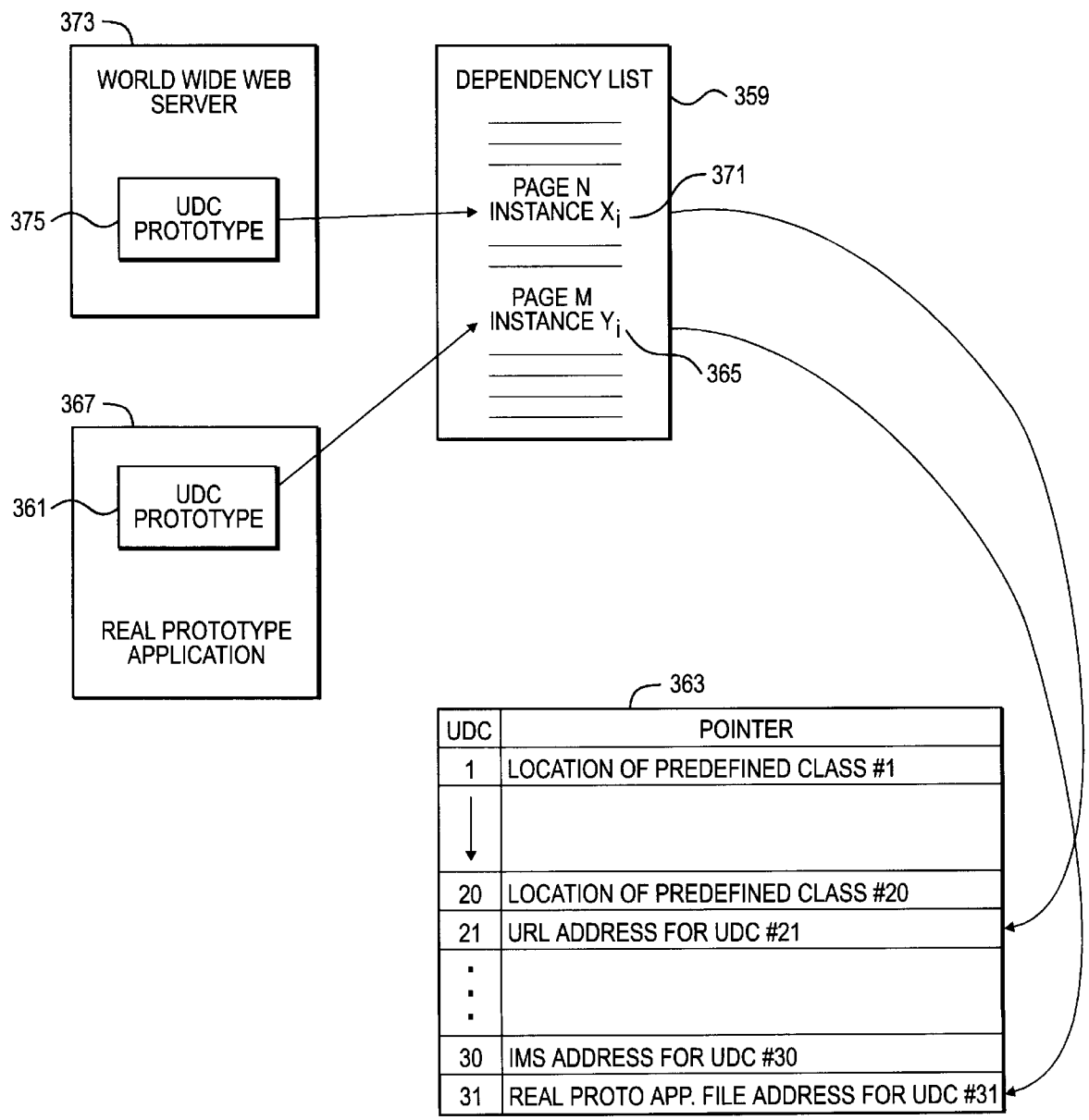
FIG. 5 is a block diagram illustrating a process of the system for locating an appropriate prototype at runtime.

The features employed by the interpreter to locate the prototype at runtime are depicted schematically in FIG. 5. As shown, a dependency list 359 is obtained when the application is unpacked before execution. The dependency list itself is divided into the various pages which comprise the application. Some of these pages, such as pages N and M as shown, include instances of prototypes. In the example shown, page N includes an instance $X_i$ of a UDC prototype 375 located on a World Wide Web site (Web server 373). Similarly, a page M includes an instance $Y_i$ of a UDC prototype 361 located in a remote application 367, accessible, for instance, via a remote procedure call (RPC). The RPC format can comprise MS RPC, as provided by Microsoft Corp. of Redmond, Wash.

During unpacking, the interpreter generates a table for all object classes used by the application. Initially the table is populated with pre-defined classes (i.e., default classes provided with the application developing environment, as opposed to classes defined by a user). Typically, twenty or more pre-defined classes are provided. Each pre-defined class is given its known number as indicated in the left-hand column of table 363. This number is used as an index for various classes required for execution of the application. In the right-hand column of table 363 a pointer to the address of the corresponding class object is provided.

After the table has been populated with the predefined classes as shown, the interpreter issues a new class number each time it encounters a UDC reference from the dependency list 359. Each new class number is added as a new row in table 363, with an associated pointer included. For example, the first UDC in table 363 is given the number 21 and includes a pointer to a URL address. This address would, typically, be specified by the developer at authoring time, such as specifying as the address of World Wide Web server 373 containing UDC prototype 375. As shown in the example of FIG. 5, when the dependency list 359 specifies an instance 365 of UDC prototype 361, the interpreter generates a new UDC number 31 and a pointer to a real prototype application 367 where UDC prototype 361 resides. Similarly, a UDC number is generated for instance 371.

During execution, the interpreter will encounter instances of UDC prototypes. When such instances are encountered, the interpreter first consults table 363 to locate the entry associated with the UDC's number. From this table entry, it obtains a pointer to the address of the prototype it requires. If the prototype is local, the interpreter simply looks to the appropriate page or reference page of the executing application. If the location is remote, on the other hand, the system fetches the prototype from the appropriate server or file location and brings it into memory.

In a preferred embodiment, when the developer specifies that a UDC prototype should be obtained from a remote location, the authoring environment includes, as a backup, a current copy of the prototype for storage with the application. In this manner, if the prototype cannot be obtained from the primary location which is a remote location, the interpreter simply uses the copy of the prototype that was previously bound to the application itself.

This is a particularly useful feature in the context of World Wide Web applications, as responses from URL servers can be quite unreliable. Assuming that a request for a prototype from a URL address is not satisfied, the interpreter simply instead uses the default version of the prototype residing in the application. If desired, the application can be designed so that when a default reference page is employed, the system can still automatically swap it out and replace it with the URL prototype if and when such a prototype ultimately shows up.

Internal operation

A. Structuring an application

When a multimedia application of this invention is compiled, a collection of files of specified structure and content are generated. In one preferred embodiment, the compiled application includes: (1) a file containing the application object itself and a list of the various children pages of that application object, (2) a separate file for each page of the application, and (3) a dependency list specifying the resources required for "playing" (i.e., displaying) each of the various pages which comprise the application.

The dependency list includes a listing of all pages in the application that contain instances of prototypes. Each entry in the list contains all the information required for getting all the prototypes of all the instances required to play the associated page. Suppose, for example, that a prototype for page 2 is located in an application B, and that the dependency list entry for page 2 specifies application B and the page in application B contains the prototype. Note that the application containing the real copy of the prototype could be located virtually anywhere—including on an ITV server (e.g., IMS server), on an URL (Web) server, on the machine, or on a local network.

When a multimedia application of this invention is intended to be used for interactive television, the application is executed or "played" as follows. Initially, the multimedia application is fetched and opened. Page 1 of that application is displayed immediately. To accomplish this, the interpreter initially looks to the dependency list for page 1 (or associated table) and identifies which prototypes must be obtained to play page 1. It then fetches the necessary prototypes from application B (or elsewhere as the application dictates). When all the necessary prototypes have been fetched and loaded into memory, page 1 of the application is played. These steps can be performed rather quickly in an ITV environment, where a high-bandwidth connection is provided from the ITV server to the client set top boxes.

Consider, in contrast, the scenario required for World Wide Web operation. In that case, the above sequence of steps typically would take longer to perform because several trips to and from one or more World Wide Web servers must be performed. Often, such servers may respond very slowly, if at all. Thus, the interpreter may not be able to quickly obtain the necessary components over the World Wide Web in order to immediately display the first page of the application when that application is opened.

Therefore, the present invention provides, in a preferred embodiment, a slightly different file packaging structure for those multimedia applications intended to tap resources from World Wide Web sites. To expedite play back of the first page of such application, the compiler generates a reference page which includes copies of all prototypes necessary to play page 1. Thus, at least as to those prototypes required for page 1, the compiler binds the prototypes to the application at compile time. When the application is packaged, it includes an application file (as in the case of an ITV application) that includes the application object listing all children pages of the application, the reference page containing the prototypes for page 1, and page 1 itself. Thus, when the application is to be executed, all necessary components for playing back page 1 can be found in a single file. Note that in this packaging structure, a dependency list is still provided with an entry for page 1, but that entry specifies the reference page for page 1 as the source of the prototypes necessary to play page 1. Thus, all content necessary to play page 1 is obtained locally, without any need to make round trips over the Internet.

In a preferred embodiment, the compile-time binding of page 1 prototypes is provided as a default setting. Developers are left with the option of specifying a remote location for the prototype, however. When a developer takes advantage of this option, it is likely that there will be a performance penalty in the speed in which the application is played back, but there will be the flexibility of dynamic binding. Even when a developer may specify a remote prototype, a "surrogate copy" of the remote prototype is copied and stored in a reference page at compile-time. Thus, when the application is opened, the surrogate prototype is available to play right away without delay. If the remote prototype cannot be obtained immediately, the application still brings up the remote prototype for use in the initial display of the first page. Later when the remote prototype shows up, it can be swapped into the playing page, to replace the surrogate prototype fetched from the referenced page. This may be implemented by maintaining a table of prototype instances which are currently using a real prototype from a location other than the primary location (as specified by the developer).

Typically, the preferred source of any given prototype will be specified by the developer at authoring time. Additionally, an application can be provided with an interface allowing the user at runtime to directly or indirectly specify his or her own prototype source, if desired. As an example of an indirect specification of a prototype source, the user might switch a language driver between Spanish and Russian. Using the dependency-list approach, the system could readily accommodate switching to a different source for a language-sensitive object, such as an audio clip prototype.

B. ITV file structure example

The follow example illustrates how an example ITV application is converted to a collection of files and other information at compile time. One particular goal of this file structure is to produce a representation of the application which occupies a very limited memory space, as only a relatively small memory size is available with set top boxes used in ITV.

Figure 6A:
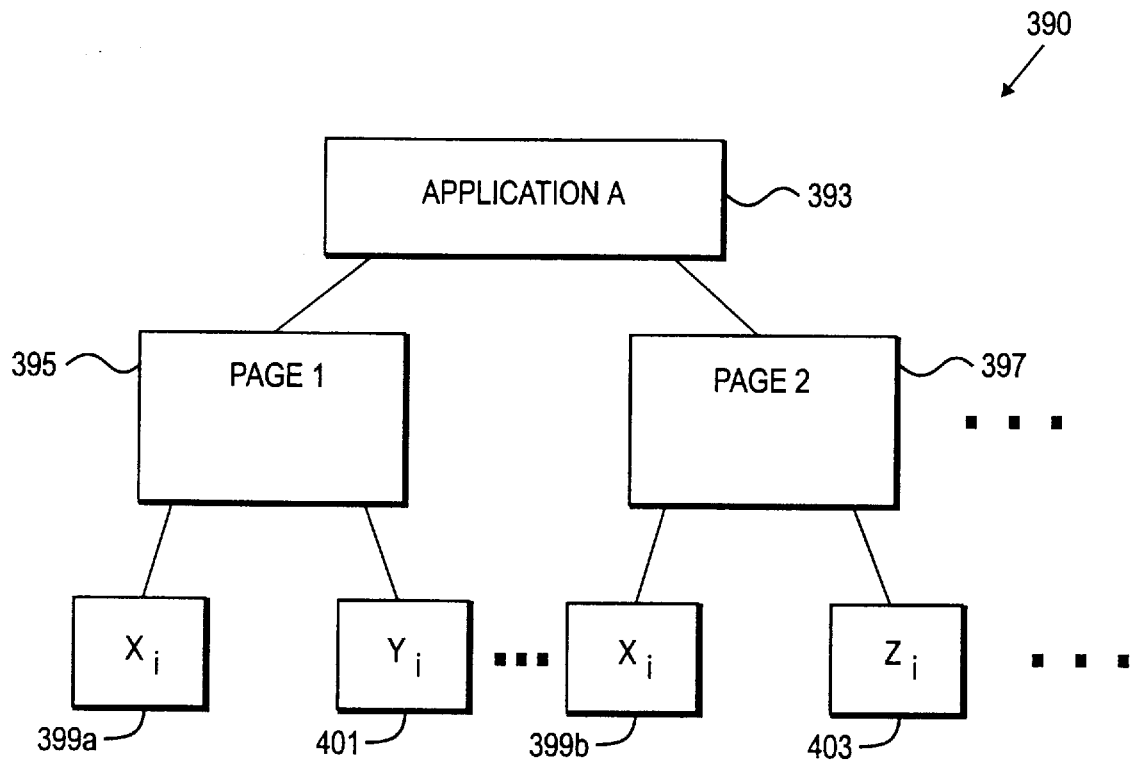
FIG. 6A is a block diagram illustrating a containment hierarchy for a sample ITV application.

A containment hierarchy 390 for a sample ITV application is shown in FIG. 6A. At the top of the hierarchy 390, an application object 393 resides. It includes two page objects: a page 1 object 395 and a page 2 object 397. The application may include other pages as well, but for the sake of simplicity, these will not be discussed in the context of this example. Page 1 object 395 includes at least two children objects: a prototype instance $X_i$ 399a and a prototype instance $Y_i$ 401. Page 2 object 397 includes a prototype instance $X_i$ 399b and a prototype instance $Z_i$ 403. Further assume that the prototype for instance $X_i$ resides at a page 1 of application B. Further, assume the prototype for instance $Y_i$ resides at a page 3 of application B, and the prototype for instance $Z_i$ resides at a page 1 of an application C. This information may be denoted as follows: A, 1-$X_i$, $Y_i$; B, 1-$X_p$, 3-$Y_p$; C, 1-$Z_p$.

Figure 6B:
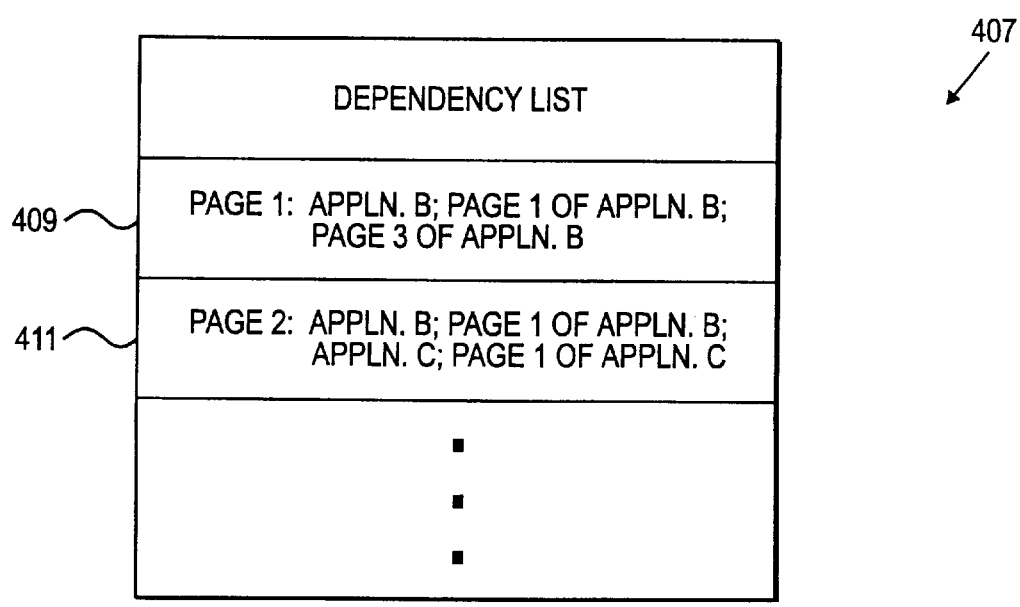
FIG. 6B is a block diagram illustrating a dependency list for the application whose hierarchy is illustrated in FIG. 6A.

A dependency list 407 shown in FIG. 6B is generated during compilation of application 390. Dependency list 407 includes an entry 409 for page 1 of application A. As indicated at entry 409, application B, pages 1 and 3 are referenced. This is because these pages of application B house the real prototypes instances $X_i$ and $Y_i$ contained in page 1 of application A. Similarly, an entry 411 of dependency list 407 references page 2 of application A. This entry again references application B, page 1 (for instance $X_i$), and also references application C, page 1 for the real prototype of instance $Z_i$.

Figure 6C:
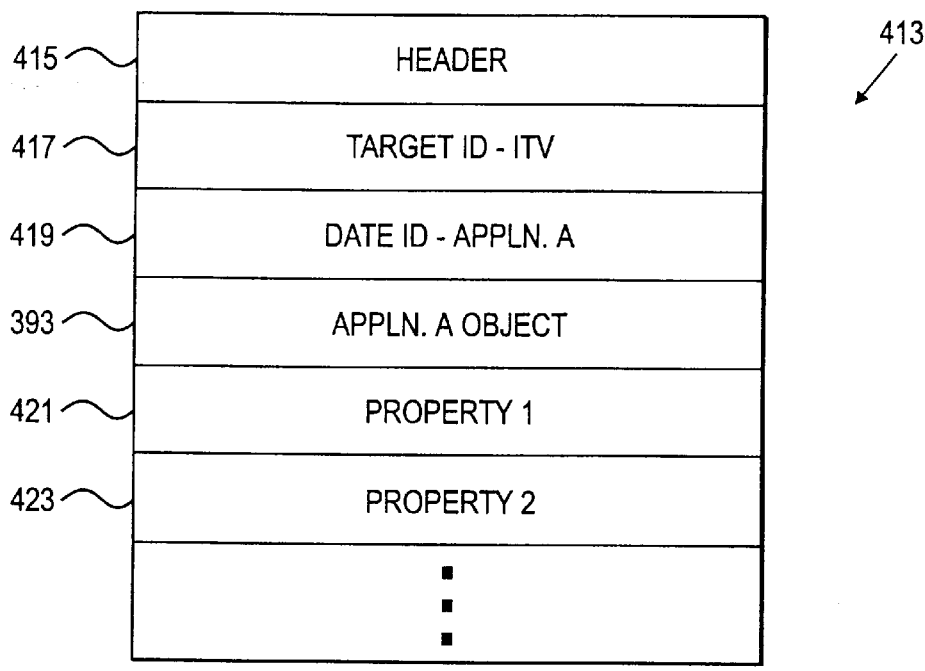
FIG. 6C is a block diagram illustrating generation of an application object file, for the application whose hierarchy is illustrated in FIG. 6A.

In addition to generating the dependency list at compile time, the compiler generates various files containing the individual objects presented in containment hierarchy 390. Initially, the compiler generates an application object file 413 as shown in FIG. 6C. This file includes a header 415 which specifies the application protocol, its version number, and how many packets are contained in the file. In a preferred embodiment, these files are generated in Interplay®, available from Sybase, Inc. of Emeryville, Calif. Next, file 413 contains a target ID 417 which specifies the platform for the compiled application. In this example, the platform is one of the available ITV platforms. Another platform which will be described below is the World Wide Web platform. Next, a data ID 419 identifies the primary object in the file. In this case, that object is application A object 393. As shown in FIG. 6C, file 413 does indeed include a packet containing application object 393. In addition, file 413 includes various properties of application object 393. In this example, application A is shown including a property 1 contained in a packet 421 and a property 2 contained in a packet 423.

Figure 6D:
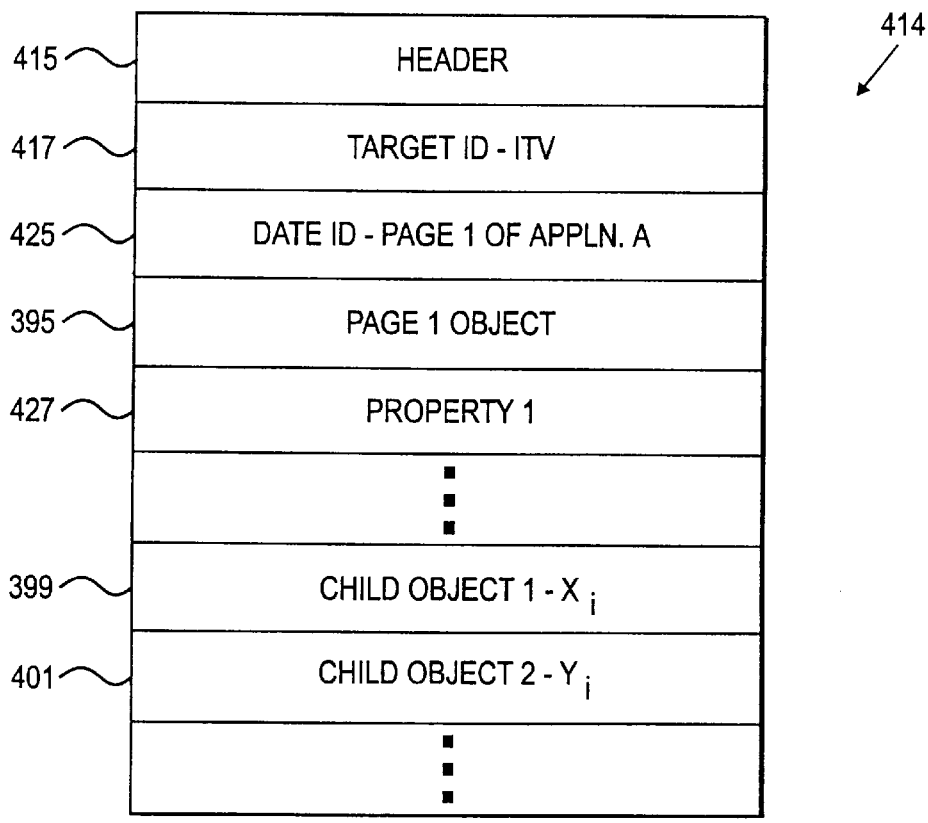
FIG. 6D is a block diagram illustrating a file produced separately for each individual page contained by the application illustrated in FIG. 6A.

In addition to producing a file for application object 393, the compiler will produce a separate file for each and everyone of the individual pages contained in application 390. Thus, as shown in FIG. 6D, a file 414 is produced for page 1 of application A. This file includes a header 415 and a target ID packet 417 containing the same information provided in the corresponding fields of file 413 described above. File 414 also includes a data ID packet 425 which specifies page 1 of application A. Next, file 414 includes a packet 395 including the page 1 object itself. Then, separate packets are provided for each of the properties of page 1 object 395, including a packet 427 for a property 1. Page 1 file 414 also includes packets containing each of the various object contained in page 1. These include a child object 1 $X_i$ 399 and a child object $Y_i$ 401 as shown. These are simply the instances of the real prototypes which reside in application B.

Figure 6E:
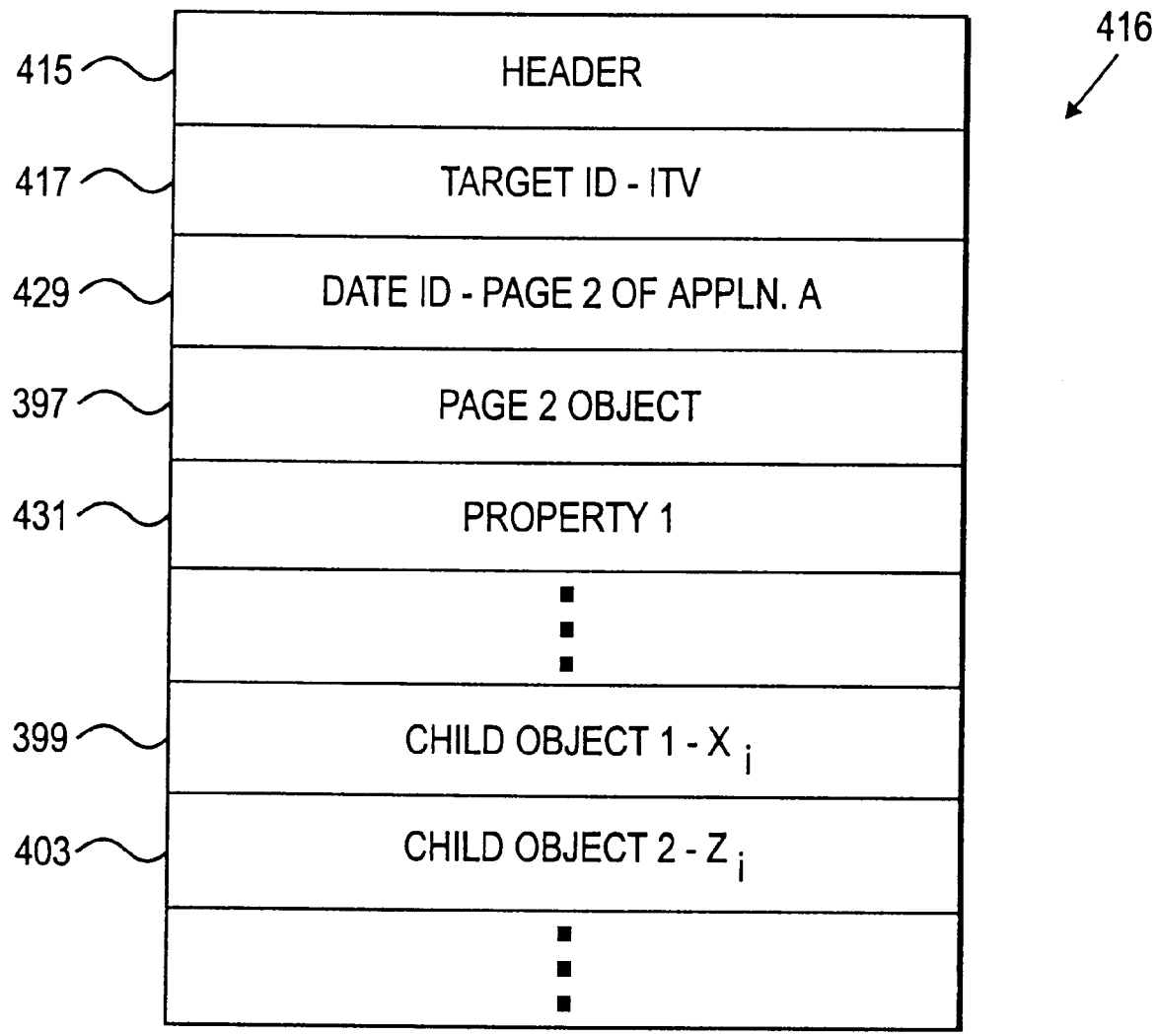
FIG. 6E is a block diagram illustrating the data structure for a file representing a page object.

Finally, FIG. 6E shows the data structure for file 416 for page 2 object 397. As shown, file 416 includes header 415, target ID packet 417, and data ID packet 429. Note that data ID packet 429 specifies page 2 of application A. Next, a packet includes page 2 object 397. A packet 431 includes a property 1 of page object 397. As indicated other properties may be provided for page 2 object 397. Next, a packet is shown for child object 1, $X_i$, 399 and a packet for a child object 2, $Z_i$, 403. As indicated, there may be other child objects provided for page 2 object 397.

When the above-described ITV application A is to be executed, the above structures are unpacked as follows. Initially, the file 413 containing the application A object 393 is unpacked. Then the dependency list or associated tables generated from the dependency list is examined for instances on page 1. In this example, the interpreter will discover instance $X_i$ contained in page 1 is dependent upon a real prototype located at page 1 of application B. Similarly, the interpreter will discover at instance $Y_i$ on application A page 1 is dependent upon a real prototype located in application B, page 3. Therefore, the next step is to fetch application B, together with pages 1 and 3 of application B. Finally, the page 1 object 395 of application A is unpacked from file 414. At this point, enough information is resident in memory to play back page 1 of the ITV application. While page 1 is playing, the interpreter proceeds to obtain the necessary files to play page 2 at the appropriate time.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a system for creating and using objects created from classes in a computer, each class providing at least one prototype defining behavior for an object, a method for providing runtime binding of classes to objects upon execution of a program, the method comprising:

specifying creation at runtime of a particular object of a particular class, said particular object being constructed to dynamically accept one of several prototypes from the particular class, in order of a pre-selected preference, during runtime execution of the program; and at runtime, creating the particular object by performing such steps of:
(i) attempting to read the prototype from the class which is preferred for creation of the particular object,
(ii) if the prototype which is preferred for creation of the particular object cannot be read, attempting to read other prototypes from the class according to the order of the pre-selected preference, until a prototype is successfully read,
(iii) if prototype for the class is found, reading a prototype from a parent class from which the object class inherits, and
(iv) creating the object based on a prototype which has been successfully read, so that the object exhibits runtime behavior defined by the prototype.

2. The method of claim 1, wherein said object comprises a user interface control.

3. The method of claim 1, wherein said particular object displays a graphic image, so that the particular graphic image displayed by the object is determined by which prototype the object has successfully read.

4. The method of claim 1, wherein the particular object is provided with a default prototype for use in the event that no prototypes can be successfully read.

5. The method of claim 4, wherein the prototypes for the class are stored on at least one remote system, except for the default prototype which is stored locally.

6. The method of claim 1, wherein at least one prototype is stored on a remote computer system.

7. The method of claim 6, wherein said at least one prototype stored on a remote computer system is stored on a remote server connected to the Internet.

8. The method of claim 1, wherein behavior defined by a prototype includes properties and methods for an object created from that prototype.

9. The method of claim 8, wherein said methods include at least one event handler for processing events which occur at objects in the system.

10. The method of claim 1, wherein step (i) and (ii) include searching for a prototype on the Internet, on a local area network, and on a local storage device.

11. The method of claim 1, wherein behavior of the particular object can be modified without change to the program, by only changing at least one of the prototypes for the object class.

12. The method of claim 11, wherein said step of changing at least of one the prototypes comprises:

changing a prototype on a computer system other than one in which the program is stored.

13. The method of claim 1, further comprising:

storing with the program at least one copy of all prototypes necessary for initial display of the program at runtime.

14. The method of claim 13, further comprising:

presenting the initial display of the program using prototypes stored with the program and, thereafter, replacing the initial display with one comprising objects created from remote prototypes, as they become available.

15. In a system for creating and using objects created from classes in a computer, each class providing at least one prototype defining behavior for an object, a method for handling events which occur at objects, the method comprising:

(a) receiving notification of an event occurring in the program;

(b) determining a particular object which is associated with the event;

(c) determining whether the particular object has an event handler capable of processing the event;

(d) if an event handler is not found, determining whether other prototypes of the class from which the object is created include an event handler capable of processing the event;

(e) if an event handler is not found, examining a next higher-level object for the event handler capable of processing the event;

(f) if an event handler is not found, repeating step (e) with a next higher-level object until an event handler is found or no higher-level object exists; and (g) if an event handler is found, invoking the event handler by passing it the event, providing normal processing of the event.

16. The method of claim 15, wherein the event occurs at an object comprising a user interface control.

17. The method of claim 16, wherein an event handler for the event is found at a page object which contains the user interface control.

18. The method of claim 15, wherein each event handler is associated with script instructions defining how the event handler is to process an event.

19. The method of claim 15, wherein said event occurs in response to user input.

* * * * *